United States Patent
Xu

(10) Patent No.: US 12,282,228 B2
(45) Date of Patent: Apr. 22, 2025

(54) FIRST WIRELESS AUDIO OUTPUT DEVICE, SECOND WIRELESS AUDIO OUTPUT DEVICE, AND BLUETOOTH DEVICE

(71) Applicant: GUANGDONG OPPO MOBILE TELECOMMUNICATIONS CORP., LTD., Guangdong (CN)

(72) Inventor: Chaojie Xu, Guangdong (CN)

(73) Assignee: GUANGDONG OPPO MOBILE TELECOMMUNICATIONS CORP. LTD., Guangdong (CN)

( * ) Notice: Subject to any disclaimer, the term of this patent is extended or adjusted under 35 U.S.C. 154(b) by 0 days.

(21) Appl. No.: 18/503,072

(22) Filed: Nov. 6, 2023

(65) Prior Publication Data
US 2024/0069389 A1    Feb. 29, 2024

Related U.S. Application Data

(63) Continuation of application No. 18/104,852, filed on Feb. 2, 2023, now Pat. No. 11,892,732, which is a
(Continued)

(30) Foreign Application Priority Data

May 11, 2021   (CN) .......................... 202110511417.4

(51) Int. Cl.
   *G02F 1/1337*   (2006.01)
   *G02F 1/1335*   (2006.01)
   *G02F 1/1343*   (2006.01)

(52) U.S. Cl.
   CPC .. *G02F 1/133711* (2013.01); *G02F 1/133512* (2013.01); *G02F 1/133753* (2013.01);
   (Continued)

(58) Field of Classification Search
   CPC ......... G02F 1/133711; G02F 1/133512; G02F 1/133753; G02F 1/134309; G02F 1/13439;
   (Continued)

(56) References Cited

U.S. PATENT DOCUMENTS

| | | | |
|---|---|---|---|
| 11,102,655 B1 * | 8/2021 | Young | H04W 12/50 |
| 2009/0097672 A1 * | 4/2009 | Buil | G06F 21/10 380/283 |

(Continued)

FOREIGN PATENT DOCUMENTS

| | | |
|---|---|---|
| CN | 104247369 A | 12/2014 |
| CN | 111629370 A | 9/2020 |
| CN | 111698794 A | 9/2020 |

OTHER PUBLICATIONS

International Search Report and Written Opinion for International Application No. PCT/CN2022/085729, mailed Jul. 6, 2022 (14 pages).

*Primary Examiner* — Mariam Qureshi
(74) *Attorney, Agent, or Firm* — Ladas & Parry LLP

(57) ABSTRACT

A first wireless audio output device, a second wireless audio output device, and a Bluetooth device are provided. The first wireless audio output device is configured to: transmit monitoring instruction information to a second wireless audio output device through a first wireless link, the monitoring instruction information being configured to instruct to monitor interactive information between the first wireless audio output device and an audio source, the first wireless audio output device and the second wireless audio output device having a same public-private key pair; and transmit a public key of the public-private key pair to the audio source and receive a public key of the audio source through a second wireless link, enable the second wireless audio
(Continued)

output device to snoop the public key of the audio source, and determine link information in the second wireless link.

20 Claims, 2 Drawing Sheets

Related U.S. Application Data continuation of application No. 17/645,884, filed on Dec. 23, 2021, now Pat. No. 11,598,991, which is a continuation of application No. 17/019,503, filed on Sep. 14, 2020, now Pat. No. 11,243,439, which is a continuation of application No. 15/127,427, filed as application No. PCT/JP2015/056156 on Mar. 3, 2015, now Pat. No. 10,795,208.

(52) U.S. Cl.
CPC .... *G02F 1/134309* (2013.01); *G02F 1/13439* (2013.01); *G02F 1/133715* (2021.01); *G02F 1/133761* (2021.01); *G02F 2202/022* (2013.01)

(58) Field of Classification Search
CPC ......... G02F 1/133715; G02F 1/133761; G02F 2202/022; H04R 2420/07; H04R 1/00; H04M 1/6066; H04M 2250/02; H04L 9/30; H04W 4/00; H04W 4/80; H04W 12/0431; H04W 12/47
See application file for complete search history.

(56) References Cited

U.S. PATENT DOCUMENTS

2012/0128154 A1    5/2012  Ran et al.
2017/0093510 A1*  3/2017  Lin ........................ H04R 27/00

\* cited by examiner

FIRST WIRELESS AUDIO OUTPUT DEVICE, SECOND WIRELESS AUDIO OUTPUT DEVICE, AND BLUETOOTH DEVICE

CROSS REFERENCE TO RELATED APPLICATIONS

The present disclosure is a continuation of International Patent Application No. PCT/CN2022/085729, filed Apr. 8, 2022, which claims priority to Chinese Patent Application No. 202110511417.4, filed May 11, 2021, both of which are herein incorporated by reference in their entireties.

TECHNICAL FIELD

The present disclosure relates to the field of Bluetooth technologies, in particular to a first wireless audio output device, a second wireless audio output device, and a Bluetooth device.

BACKGROUND

With the social progress and the improvement of people's living standards, Bluetooth headsets have become essential daily necessities.

In the related art, a Bluetooth headset includes a first sub-headset and a sub-second headset. When the first sub-headset and a terminal are paired successfully, the first sub-headset needs to transmit a Link Key or a Session Key to the second sub-headset, such that the second sub-headset may correctly decrypt a data packet on a monitoring link.

SUMMARY

According to an aspect, a first wireless audio output device is provided and configured to: transmit monitoring instruction information to a second wireless audio output device through a first wireless link, the monitoring instruction information being configured to instruct the second wireless audio output device to monitor interactive information between the first wireless audio output device and an audio source, the first wireless audio output device and the second wireless audio output device having a same public-private key pair; and transmit a public key of the public-private key pair to the audio source through a second wireless link, receive a public key of the audio source through the second wireless link, enable the second wireless audio output device to snoop the public key of the audio source after receiving the monitoring instruction information, and determine link information in the second wireless link based on a private key of the public-private key pair and the public key of the audio source.

According to an aspect, a second wireless audio output device is provided and configured to: receive monitoring instruction information from a first wireless audio output device through a first wireless link, the monitoring instruction information is configured to instruct the second wireless audio output device to monitor interactive information between the first wireless audio output device and an audio source, the first wireless audio output device and the second wireless audio output device having a same public-private key pair; snoop a public key of the audio source in a second wireless link, the second wireless link being a link configured to through which the first wireless audio output device communicates with the audio source; and determine link information in the second wireless link based on a private key of the public-private key pair and the public key of the audio source.

According to an aspect, a Bluetooth device is provided and includes n Bluetooth sub-devices, n is an integer greater than 1, and the n Bluetooth sub-devices has a same public-private key pair. A first Bluetooth sub-device is configured to: transmit monitoring instruction information to a second Bluetooth sub-device, the monitoring instruction information being configured to instruct the second Bluetooth sub-device to monitor interactive information between the first Bluetooth sub-device and a terminal; and transmit a public key of the public-private key pair to the terminal, and receive a terminal public key of the terminal. A second Bluetooth sub-device is configured to: snoop the terminal public key after receiving the monitoring instruction information from the first Bluetooth sub-device, and determine link information between the terminal and the first Bluetooth sub-device based on the terminal public key and a private key of the public-private key pair; the first Bluetooth sub-device is at least one Bluetooth sub-device in the n Bluetooth sub-devices, and the second Bluetooth sub-device is any one of the n Bluetooth sub-devices except the first Bluetooth sub-device.

DETAILED DESCRIPTION

In order to make the purpose, technical solution and technical effect of the present disclosure more clearly, some embodiments of the present disclosure will be further described in detail below in combination with the drawings.

Figure 1:
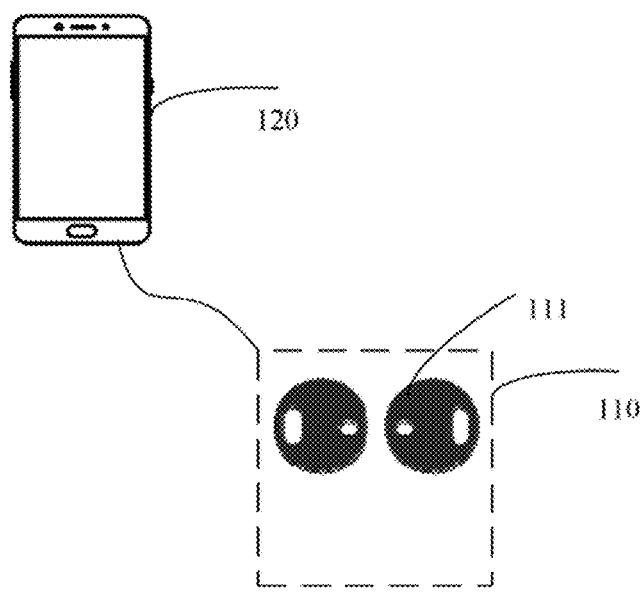
FIG. 1 is a schematic diagram of an application scenario of a Bluetooth device and a terminal according to some embodiments of the present disclosure.

As shown in FIG. 1, FIG. 1 is a schematic diagram of an application scenario of a Bluetooth device and a terminal according to some embodiments of the present disclosure.

In some embodiments of the present disclosure, a Bluetooth device 110 is a device having a Bluetooth function. The Bluetooth device 110 includes n Bluetooth sub-devices 111, and n is an integer greater than 1. The Bluetooth sub-devices are devices that have Bluetooth chips and may independently communicate with a terminal (or called "terminal device"). In some embodiments, the Bluetooth sub-devices 111 included in the Bluetooth device 110 have same structures. In some embodiments, the Bluetooth sub-device 111 included in the Bluetooth device 110 have different structures. In some embodiments, manufacturers of the Bluetooth sub-devices 111 included in the Bluetooth device 110 are same. In some embodiments, the Bluetooth device 110 includes a Bluetooth headset, in this case, the Bluetooth headset includes following Bluetooth sub-devices: a first Bluetooth sub-headset, a second Bluetooth sub-headset, and a charging box. In some embodiments, the Bluetooth device 110 includes a Bluetooth stereo speaker, in this case, that the Bluetooth stereo speaker includes following Bluetooth sub-devices: a first Bluetooth sub-speaker and a second Bluetooth sub-speaker, etc. (the number of Bluetooth sub-speakers included in the Bluetooth stereo speaker are not limited).

In some embodiments, the terminal 120 is an electronic device that communicates with the Bluetooth device 110. In some embodiments, the terminal 120 includes an electronic device such as a mobile phone, a television, a tablet, or a personal computer (PC), etc. In some embodiments, the terminal 120 may be configured to provide data to the Bluetooth device 110. For example, the terminal 120 may be configured to provide audio data to the Bluetooth device 110.

The terminal 120 communicates with the Bluetooth device 110 through Bluetooth, and the terminal 120 communicates with each Bluetooth sub-device 111 through Bluetooth. The Bluetooth sub-devices 111 may communicate with each other in a wired or wireless manner, such as via a data wire, or via Bluetooth.

The present disclosure is introduced and explained by several embodiments.

Figure 2:
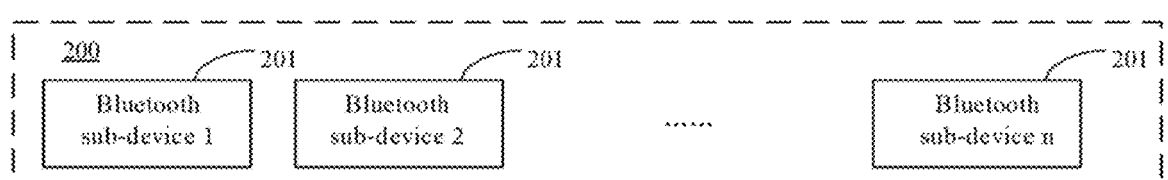
FIG. 2 is a schematic diagram of a Bluetooth device according to some embodiments of the present disclosure.

As shown in FIG. 2, FIG. 2 is a schematic diagram of a Bluetooth device according to some embodiments of the present disclosure. A Bluetooth device 200 includes n Bluetooth sub-devices 201 having a same public-private key pair, n is an integer greater than 1. The n Bluetooth sub-devices may be a Bluetooth sub-device 1, a Bluetooth sub-device 2, Bluetooth sub-device 3, . . . , or a Bluetooth sub-device n.

Wireless link is a communication term, which is a wireless physical link connected to one or more devices or communication controllers. The wireless link may be implemented through a Bluetooth, a Wireless Fidelity (WiFi), a cellular communication, or other technologies. In some embodiments of the present disclosure, the wireless link may be implemented in a form of Bluetooth. A first wireless audio output device may be the first Bluetooth sub-device, a second wireless audio output device may be the second Bluetooth sub-device, and an audio source may be the terminal.

The public-private key pair includes a public key and a private key. The public key and the private key form a key pair acquired through an algorithm. The public key is a public part of the key pair, and the private key is a non-public part. The public key is used to encrypt a session key, verify a digital signature, or encrypt data that may be decrypted with a corresponding private key. When using the key pair, if a piece of data is encrypted by one key, the piece of data can be decrypted only by the other key. In some embodiments, data encrypted by a public key is decrypted only by a private key, and data encrypted by the private key is decrypted only by the public key. Otherwise, the decryption will not succeed. In some embodiments, the public-private key pair may also be called key dispatch.

In some embodiments, n Bluetooth sub-devices have a same Elliptic Curve Diffie Hellman (ECDH) public-private key pair. The ECDH is a Diffie Hellman (DH) key exchange algorithm based on an Elliptic Curve Cryptosystems (ECC). The ECC is a cryptosystem based on a discrete logarithm problem of an elliptic curve. Given a point P and an integer k on the elliptic curve, it is easy to solve Q=kP. Given a point P and Q, knowing that Q=kP, finding the integer k is a difficult problem, and ECDH is based on this mathematical problem.

Figure 3:
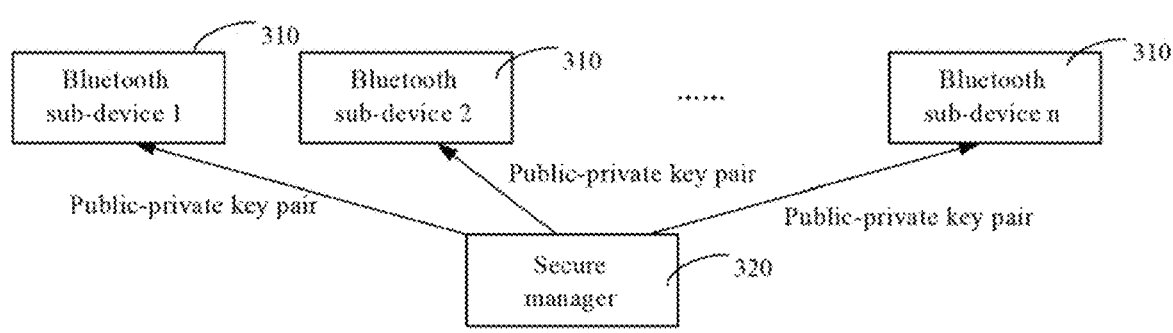
FIG. 3 is a schematic diagram illustrating an interaction between a secure manager and Bluetooth sub-devices according to some embodiments of the present disclosure.

In some embodiments, the first wireless audio output device receives a public-private key pair from the secure manager. As shown in FIG. 3, a Bluetooth sub-device 310 is configured to receive a public-private key pair from a secure manager 320. After generating the public-private key pair, the secure manager transmits the public-private key pair to each Bluetooth sub-device 310 one by one. In some embodiments, the secure manager 320 may be a module belonging to the entire Bluetooth device. The secure manager includes any one of a Bluetooth headset charging box and a production line burning device. The first wireless audio output device includes any one of a Bluetooth headset and a Bluetooth speaker. In some embodiments, the Bluetooth device being a Bluetooth headset is taken as an example, the secure manager 320 may be a charging box of the Bluetooth headset or a module integrated in the charging box. In some embodiments, the secure manager 320 may also be a part other than a Bluetooth device. In some embodiments, the secure manager 320 may be a production line burning device, which is a tool configured to write data to a programmable integrated circuit on a production line.

In some embodiments, the public-private key pair shared by the Bluetooth sub-device is preset in the production line and will not be updated.

In some embodiments, the public-private key pair shared by the Bluetooth sub-device is generated in the Bluetooth device and distributed to each Bluetooth sub-device. The public-private key pair will not be updated, or will be updated once per pairing is completed.

The first Bluetooth sub-device is configured to transmit monitoring instruction information to the second Bluetooth sub-device, and the monitoring instruction information is configured to instruct the second Bluetooth sub-device to monitor interactive information between the first Bluetooth sub-device and the terminal.

In some embodiments, the first Bluetooth sub-device is at least one Bluetooth sub-device of the n Bluetooth sub-devices. The first Bluetooth sub-device is a Bluetooth sub-device that interacts with the terminal. In some embodiments, the first Bluetooth sub-device may be any one or more Bluetooth sub-devices of the Bluetooth sub-device 1, the Bluetooth sub-device 2, . . . , and the Bluetooth sub-device n. The Bluetooth sub-device interacting with the terminal is a random Bluetooth sub-device, that is, the first Bluetooth sub-device is a random Bluetooth sub-device.

The interactive information is information transmitted between the terminal and the first Bluetooth sub-device. In some embodiments, the interactive information may be plaintext information transmitted by the first Bluetooth sub-device and the terminal during a pairing process. During the pairing process of the first Bluetooth sub-device and the terminal, a link between the first Bluetooth sub-device and the terminal is not encrypted, plaintext data is transmitted between the first Bluetooth sub-device and the terminal, and the plaintext data may be acquired by the second Bluetooth sub-device.

In some embodiments, after the first Bluetooth sub-device establishes a connection (a physical connection which represents a connection between two devices, may be associated with a physical channel. In some embodiments, the physical connection represents a connection through a Bluetooth channel, rather than a wire connection through touching each other) with the terminal, the first Bluetooth sub-device transmits monitoring instruction information to the second Bluetooth sub-device, and then the first Bluetooth sub-device and the terminal enter the pairing process. The monitoring instruction information may also be used to instruct that the first Bluetooth sub-device and the terminal are about to start pairing. The second Bluetooth sub-device may start to monitor the transmitted plaintext information in the pairing process of the first Bluetooth sub-device and the terminal.

In some embodiments, the first Bluetooth sub-device may transmit the monitoring instruction information to the second Bluetooth sub-device through a wired or wireless manner. In some embodiments, the first Bluetooth sub-device may broadcast the monitoring instruction information to the second Bluetooth sub-device. In some embodiments, the first Bluetooth sub-device may transmit a data packet to the second Bluetooth sub-device, and the data packet includes the monitoring instruction information. In some embodiments, the first Bluetooth sub-device may transmit the monitoring instruction information to the second Bluetooth sub-device through a data wire.

The first Bluetooth sub-device is also configured to transmit the public key of the public-private key pair to the terminal and receive a terminal public key from the terminal.

In response to the first Bluetooth sub-device and the terminal entering the pairing process, the first Bluetooth sub-device and the terminal exchanges their public keys with each other. The terminal generates its own public-private key pair, which includes a terminal public key and a terminal private key.

In some embodiments, the terminal transmits the terminal public key to the first Bluetooth sub-device. After receiving the terminal public key from the terminal, the first Bluetooth sub-device transmits the public key of the public-private key pair to the terminal.

In some embodiments, the first Bluetooth sub-device transmits the public key of the public-private key pair to the terminal. After receiving the public key from the first Bluetooth sub-device, the terminal transmits the terminal public key to the first Bluetooth sub-device.

In some embodiments, the terminal and the first Bluetooth sub-device transmit their own public keys to each other at a same time or simultaneously, that is, a time point when the terminal transmits the terminal public key to the first Bluetooth sub-device is the same as a time point when the first Bluetooth sub-device transmits the public key to the terminal.

The second Bluetooth sub-device is configured to snoop or monitor the terminal public key after receiving the monitoring instruction information from the first Bluetooth sub-device, and determine link information between the terminal and the first Bluetooth sub-device based on the terminal public key and the private key of the public-private key pair.

The link information is configured to represent information of a link between devices. Devices (such as the above terminal and the above first Bluetooth sub-device) at both ends of the link are connected to a Bluetooth link through the link information. The link information includes information of devices at both ends of the link and information of the link. The devices at both ends of the link need to have the link information to generate or establish a corresponding link.

In some embodiments, the second Bluetooth sub-device is any one of the Bluetooth sub-devices except or other than the first Bluetooth sub-device of the n Bluetooth sub-devices.

Figure 4:
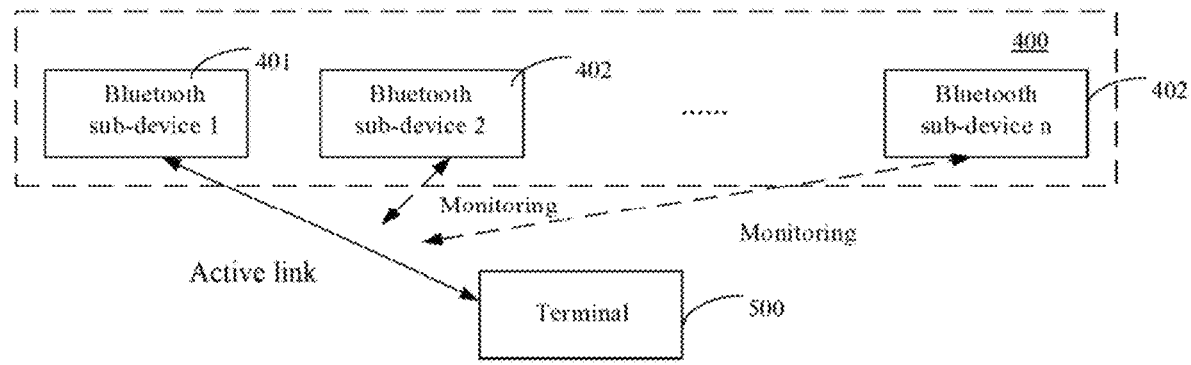
FIG. 4 is a schematic diagram illustrating an interaction between Bluetooth sub-devices and a terminal according to some embodiments of the present disclosure.

As shown in FIG. 4, the Bluetooth device 400 includes n Bluetooth sub-devices. An active link is established between a first Bluetooth sub-device 401 (assumed to be the Bluetooth sub-device 1) and a terminal 500. The active link is an entity link or physical link transmitting and receiving information. After receiving the monitoring instruction information, a second Bluetooth sub-device 402 (assumed to be the Bluetooth sub-device 2, . . . , or the Bluetooth sub-device n) snoops or monitor interactive information between the first Bluetooth sub-device 401 and the terminal 500 at all times. An active link is not established between the second Bluetooth sub-device 402 and the terminal 500.

The Bluetooth device being a Bluetooth headset is taken as an example, the first Bluetooth sub-device may be a first Bluetooth sub-headset, and the second Bluetooth sub-device may be a second Bluetooth sub-headset. The first Bluetooth sub-headset transmits monitoring instruction information to the second Bluetooth sub-headset, transmits a public key of a public-private key pair to the terminal, and receives a terminal public key from the terminal. After receiving the monitoring instruction information from the first Bluetooth sub-headset, the second Bluetooth sub-headset snoops the terminal public key, and determines link information between the terminal and the first Bluetooth sub-headset based on the terminal public key and a private key.

In some embodiments, after determining the link information, the second Bluetooth sub-device is successfully paired with the terminal. The second Bluetooth sub-headset may acquire link information between the terminal and the first Bluetooth sub-headset through the determined link information, and acquire interaction information between the first Bluetooth sub-device and the terminal.

Since all Bluetooth sub-devices share a same public-private key pair, the second Bluetooth sub-device may independently acquire the link information by monitoring the interaction between the first Bluetooth sub-device and the terminal in the air during a pairing process of the first Bluetooth sub-device and the terminal.

In some embodiments, each Bluetooth sub-device in a Bluetooth device sets the same public-private key pair, such that one Bluetooth sub-device binds an encryption process with the terminal, and other Bluetooth sub-devices may determine the same link information through monitoring. It is not necessary for other Bluetooth sub-devices to decrypt a data packet by transmitting link information during monitoring subsequent encryption links.

To sum up, in the technical solution provided by some embodiments of the present disclosure, each Bluetooth sub-device included in the Bluetooth device shares the same public-private key pair. The first Bluetooth sub-device transmits the monitoring instruction information to the second Bluetooth sub-device, such that the second Bluetooth sub-device snoops the terminal public key transmitted by the terminal to the first Bluetooth sub-device. The second Bluetooth device determines the link information between the terminal and the first Bluetooth sub-device based on the terminal public key and the private key of the public-private key pair. Compared with the first Bluetooth sub-device transmitting the link information to the second Bluetooth sub-device in the related art, the technical solution of the present disclosure improves a security of the Bluetooth device and reduces a security risk of the Bluetooth device.

In some embodiments, the second Bluetooth sub-device determines the link information by following methods.

First, the second Bluetooth sub-device determines the shared key between the terminal and the first Bluetooth sub-device based on the terminal public key and the private key of the public-private key pair.

In some embodiments, when the Bluetooth sub-device and the terminal support a secure connection, the second Bluetooth sub-device determines a shared key DHkey by a following formula.

DHkey=P256 (a private key of a local end, a public key of an opposite end)

P256 ( ) is a P-256 elliptic curve, the private key of a local end is the private key of the public-private key pair, and the public key of an opposite end is the terminal public key.

In some embodiments, when any one of the Bluetooth sub-device and the terminal does not support the secure connection, the second Bluetooth sub-device determines the shared key DHkey by a following formula.

DHkey=P192 (a private key of a local end, a public key of an opposite end)

P192 ( ) is a P-192 elliptic curve, the private key of a local end is the private key of the public-private key pair, and the public key of an opposite end is the terminal public key.

Correspondingly, when the Bluetooth sub-device and the terminal support secure connection, the terminal may determine the shared key by the following formula: DHkey=P256 (the terminal private key, the public key). When any one of the Bluetooth sub-device and the terminal does not support the secure connection, the terminal may determine the shared key by the following formula: DHkey=P192 (the terminal private key, the public key).

Second, the second Bluetooth sub-device determines the link information based on the shared key.

When determining the shared key, the second Bluetooth sub-device may determine the link information based on the shared key.

In some embodiments, when the Bluetooth device and the terminal use a classic Bluetooth protocol, the link information includes a link key (LK).

The link key may also be called a link key word, which is used to establish an identification key word of the connection between two devices.

The first Bluetooth sub-device is also configured to receive a first random number from the terminal and transmit a second random number to the terminal.

The first random number is a random value selected by the terminal, and the second random number is a random value selected by the first Bluetooth sub-device.

In some embodiments, the first random number and the second random number are 128-bit values, and the first random number and the second random number are number once (nonce), which are arbitrary or non-repeated random values that are used only once or one time.

The second Bluetooth sub-device is also configured to snoop the first random number and the second random number.

The first Bluetooth sub-device and the terminal exchange the random values with each other, and the second Bluetooth sub-device snoops the first random number and the second random number in the process of exchanging random values between the first Bluetooth sub-device and the terminal.

The second Bluetooth sub-device is also configured to determine the link key based on the shared key, the first random number, the second random number, a plaintext string, a Bluetooth address of the terminal, and a Bluetooth address of the first Bluetooth sub-device.

In some embodiments, the Bluetooth address may also be called a Bluetooth address, which is a unique 48-bit identifier assigned to each device by a manufacturer and is used to uniquely identify a physical device. The Bluetooth address is displayed as 6 bytes, in hexadecimal, and separated by a colon. The Bluetooth address includes a non-significant address part (NAP), an upper address part (UAP) and a lower address part (LAP). The NAP includes 2 bytes, is the first 16 bits of an organizationally unique identifier (OUI), and may be used for frequency-hopping synchronization frame. The UAP includes 1 byte, is the remaining 8 bits of the OUI, and is used as a seed of various Bluetooth specification algorithms. The LAP includes 3 bytes, is allocated by a device supplier, and is configured to uniquely identify a Bluetooth device. The LAP and UAP constitute a significant address part (SAP) of the Bluetooth address.

In some embodiments, the first Bluetooth sub-device establishes a connection with the terminal, and the first Bluetooth sub-device and the terminal exchange their Bluetooth addresses with each other, that is, the first Bluetooth sub-device transmits its own Bluetooth address (i.e., the Bluetooth address of the first Bluetooth sub-device) to the terminal, and the terminal transmits its own Bluetooth address (i.e., the Bluetooth address of the terminal) to the first Bluetooth sub-device. The first Bluetooth sub-device transmits the monitoring instruction information to the second Bluetooth sub-device, and the monitoring instruction information includes the Bluetooth address of the terminal.

All Bluetooth sub-devices know each Bluetooth address of each Bluetooth sub-device, which may be preset in a factory or set when the all Bluetooth sub-devices are bound into a complete device (the Bluetooth device).

In some embodiments, the second Bluetooth sub-device determines the LK by a following formula:

LK=f2 (DHkey, the first random number, the second random number, "btlk", the Bluetooth address of the terminal, and the Bluetooth address of the first Bluetooth sub-device).

The f2 ( ) is a function used to calculate the LK, and the "btlk" is a plaintext string.

In some embodiments, when the Bluetooth device and the terminal use a Bluetooth low energy (BLE) protocol, the link information includes a long term key (LTK).

The first Bluetooth sub-device is also configured to receive a third random number from the terminal and transmit a fourth random number to the terminal.

The third random number is a random value selected by the terminal, and the fourth random number is a random value selected by the first Bluetooth sub-device.

In some embodiments, the third and fourth random numbers are 128-bit values, and the third and fourth random numbers are nonce, which are arbitrary or non-repeated random values that are used only once.

The second Bluetooth sub-device is also configured to snoop the third and fourth random numbers.

The first Bluetooth sub-device and the terminal exchange their random values with each other, and the second Bluetooth sub-device snoops the third random number and the fourth random number in the process of exchanging random values between the first Bluetooth sub-device and the terminal.

The second Bluetooth sub-device is also configured to determine the LTK based on the shared key, the third random number, the fourth random number, the Bluetooth address of the terminal, and the Bluetooth address of the first Bluetooth sub-device.

In some embodiments, the second Bluetooth sub-device determines the LTK by a following formula:

LTK=f5 (DHkey, the third random number, the fourth random number, the Bluetooth address of the terminal, and the Bluetooth address of the first Bluetooth sub-device)

The f5 ( ) is a function used to calculate the LTK.

In some embodiments, after the second Bluetooth sub-device determines the link information, the second Bluetooth sub-device may also be configured to: determine a session key based on the link information, decrypt communication data between the first Bluetooth sub-device and the terminal based on the session key, and acquire a decrypted communication data.

The link information may be configured to calculate the session key. The second Bluetooth sub-device may decrypt audio data transmitted between the terminal and the first Bluetooth sub-device based on the session key, and acquire the decrypted audio data.

In some embodiments, the first Bluetooth sub-device is also configured to receive a fifth random number from the terminal and transmit a sixth random number to the terminal.

The fifth random number is a random value selected by the terminal, and the sixth random number is a random value selected by the first Bluetooth sub-device.

In some embodiments, the fifth and sixth random numbers are nonce, which are arbitrary or non-repeated random values that are used only once.

The second Bluetooth sub-device is also configured to determine the session key based on the link information, the fifth random number, and the sixth random number.

In the process of generating the session key through interaction between the first Bluetooth sub-device and the terminal, the second Bluetooth sub-device may independently calculate the session key by monitoring the interaction between the first Bluetooth sub-device and the terminal in the air. Furthermore, the data that the first Bluetooth sub-device interacts with the terminal in the encryption link may be decrypted by the second Bluetooth sub-device after monitoring in the air.

In some embodiments, all Bluetooth sub-devices in the Bluetooth device share the same public-private key pair, when one Bluetooth sub-device is paired with the terminal, other Bluetooth sub-devices in the Bluetooth device may independently acquire or calculate the link information between the one Bluetooth sub-device and the terminal through monitoring. In this way, as long as one Bluetooth sub-device is connected to the terminal, other Bluetooth sub-devices in the Bluetooth device may deduce the session key according to the acquired calculated link information, such that the encrypted data between the one Bluetooth sub-device and the terminal may be decrypted.

In some embodiments, a first wireless audio output device is provided. The first wireless audio output device is configured to:
  transmit monitoring instruction information to a second wireless audio output device through a first wireless link; the monitoring instruction information being configured to instruct the second wireless audio output device to monitor interactive information between the first wireless audio output device and an audio source; the first wireless audio output device and the second wireless audio output device having a same public-private key pair; and
  transmit a public key of a public-private key pair to the audio source through a second wireless link, receive a public key of the audio source through the second wireless link; enable the second wireless audio output device to snoop the public key of the audio source after receiving the monitoring instruction information, and determine link information in the second wireless link based on a private key of the public-private key pair and the public key of the audio source.

In some embodiments, the first wireless audio output device receives the public-private key pair from a secure manager.

In some embodiments, the secure manager includes any one of a Bluetooth headset charging box and a production line burning device In some embodiments, the first wireless audio output device includes any one of a Bluetooth headset and a Bluetooth speaker.

In some embodiments, a second wireless audio output device is provided. The second wireless audio output device is configured to:
  receive the monitoring instruction information from the first wireless audio output device through the first wireless link; the monitoring instruction information being configured to instruct the second wireless audio output device to monitor the interactive information between the first wireless audio output device and the audio source; the first wireless audio output device and the second wireless audio output device having the same public-private key pair;
  snoop a public key of the audio source in a second wireless link; the second wireless link being a link through which the first wireless audio output device communicates with the audio source; and
  determine link information in the second wireless link based on the private key of the public-private key pair and the public key of the audio source.

In some embodiments, the second wireless audio output device is configured to:
  determine the shared key between the first wireless audio output device and the audio source based on the public key of the audio source and the private key of the public-private key pair; and
  determine the link information based on the shared key.

In some embodiments, the link information includes a link key, and the second wireless audio output device is configured to:
  snoop a random number in the second wireless link; and
  determine the link key based on the shared key, the random number, a Bluetooth address of the audio source, and a Bluetooth address of the first wireless audio output device.

In some embodiments, the link information includes a LTK, and the second wireless audio output device is configured to:
  snoop the random number on the second wireless link; and
  determine the LTK based on the shared key, the random number, the Bluetooth address of the audio source, and the Bluetooth address of the first wireless audio output device.

In some embodiments, the second wireless audio output device is also configured to:
  determine the session key based on the link information; and
  decrypt communication data in the second wireless link based on the session key, and acquire the decrypted communication data.

In some embodiments, the second wireless audio output device is configured to:
  snoop the random number in the second wireless link; and
  determine the session key based on the link information and the random number.

The first wireless audio output device is equivalent to the first Bluetooth sub-device described in the above embodiments, the second wireless audio output device is equivalent to the second Bluetooth sub-device described in the above embodiments, and the audio source is equivalent to the terminal described in the above embodiments. Detailed description of operations of each device may be referred to the description in the above embodiments, which is not repeated here.

Following are system embodiments of the present disclosure. Details not disclosed in the system embodiments may be referred to the device embodiments.

Figure 5:
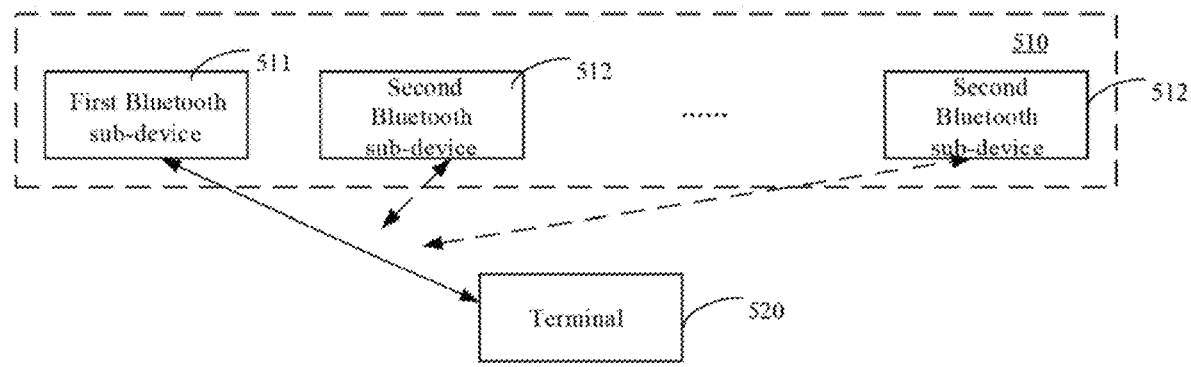
FIG. 5 is a schematic diagram of a key determination system according to some embodiments of the present disclosure.

As shown in FIG. 5, FIG. 5 is a schematic diagram of a key determination system according to some embodiments of the present disclosure. The system includes a Bluetooth device 510 and a terminal 520. The Bluetooth device 510 includes n Bluetooth sub-devices, and the n is an integer greater than 1. The n Bluetooth sub-devices have a same public-private key pair.

A first Bluetooth sub-device 511 is configured to transmit monitoring instruction information to a second Bluetooth sub-device 512, and the monitoring instruction information is used to instruct the second Bluetooth sub-device 512 to monitor interactive information between the first Bluetooth sub-device 511 and the terminal 520.

The first Bluetooth sub-device 511 is also configured to transmit a public key of the public-private key pair to the terminal 520.

The terminal 520 is configured to transmit a terminal public key to the first Bluetooth sub-device 511.

The second Bluetooth sub-device 512 is configured to: snoop the terminal public key after receiving the monitoring instruction information from the first Bluetooth sub-device 511, and determine link information between the terminal 520 and the first Bluetooth sub-device 511 based on the terminal public key and a private key of the public-private key pair.

The first Bluetooth sub-device 511 is at least one Bluetooth sub-device in the n Bluetooth sub-devices, and the second Bluetooth sub-device 512 is any one of the Bluetooth sub-devices in the n Bluetooth sub-devices except the first Bluetooth sub-device 511.

To sum up, in the technical solution provided by some embodiments of the present disclosure, each Bluetooth sub-device included in the Bluetooth device shares the same public-private key pair. The first Bluetooth sub-device 511 transmits the monitoring instruction information to the second Bluetooth sub-device 512, such that the second Bluetooth sub-device 512 snoops the terminal public key transmitted by the terminal 520 to the first Bluetooth sub-device 511. The second Bluetooth device determines the link information between the terminal 520 and the first Bluetooth sub-device 511 based on the terminal public key and the private key of the public-private key pair. Compared with the first Bluetooth sub-device 511 transmitting the link information to the second Bluetooth sub-device 512 in the related art, the technical solution of the present disclosure improves a security of the Bluetooth device and reduces a security risk of the Bluetooth device. In some embodiments, the second Bluetooth sub-device 512 is configured to:

determine a shared key between the terminal 520 and the first Bluetooth sub-device 511 based on the terminal public key and the private key of the public-private key pair; and determine the link information based on the shared key.

In some embodiments, the link information includes a link key, the terminal 520 is also configured to transmit a first random number to the first Bluetooth sub-device 511, the first Bluetooth sub-device 511 is also configured to transmit the second random number to the terminal 520; the second Bluetooth sub-device 512 is also configured to snoop the first random number and the second random number, and determine the link key based on the shared key, the first random number, the second random number, a plaintext string, a Bluetooth address of the terminal 520, and a Bluetooth address of the first Bluetooth sub-device 511.

The first random number is a random value selected by the terminal 520, and the second random number is a random value selected by the first Bluetooth sub-device 511.

In some embodiments, the link information includes a LTK, the terminal 520 is further configured to transmit a third random number to the first Bluetooth sub-device 511; the first Bluetooth sub-device 511 is further configured to transmit a fourth random number to the terminal 520; the second Bluetooth sub-device 512 is further configured to snoop the third random number and the fourth random number, and determine the LTK based on the shared key, the third random number, the fourth random number, the Bluetooth address of the terminal 520, and the Bluetooth address of the first Bluetooth sub-device 511.

The third random number is a random value selected by the terminal 520, and the fourth random number is a random value selected by the first Bluetooth sub-device 511.

In some embodiments, the second Bluetooth sub-device 512 is also configured to: determine a session key based on the link information; and decrypt communication data between the first Bluetooth sub-device 511 and the terminal 520 based on the session key, and acquire the decrypted communication data.

In some embodiments, the terminal 520 is further configured to transmit the fifth random number to the first Bluetooth sub-device 511; the first Bluetooth sub-device 511 is further configured to transmit the sixth random number to the terminal 520; and the second Bluetooth sub-device 512 is further configured to snoop the fifth random number and the sixth random number and determine the session key based on the link information, the fifth random number, and the sixth random number.

The fifth random number is a random value selected by the terminal 520, and the sixth random number is a random value selected by the first Bluetooth sub-device 511.

In some embodiments, the Bluetooth sub-device is configured to receive the public-private key pair from a secure manager.

Some embodiments of the present disclosure also provide a wireless audio system, the wireless audio system includes a first wireless audio output device and at least one second wireless audio output device. The first wireless audio output device and the second wireless audio output device have a same public-private key pair.

The first wireless audio output device is configured to transmit monitoring instruction information to the second wireless audio output device through a first wireless link, and the monitoring instruction information is configured to instruct the second wireless audio output device to monitor interactive information between the first wireless audio output device and an audio source.

The first wireless audio output device is further configured to transmit a public key of the public-private key pair to the audio source through a second wireless link and receive a public key from the audio source through the second wireless link.

The second wireless audio output device is configured to snoop the public key of the audio source in the second wireless link in case where the second wireless audio output device receives the monitoring instruction information.

The second wireless audio output device is further configured to determine link information in the second wireless link based on a private key of the public-private key pair and the public key of the audio source.

A first wireless audio output device is provided and configured to: transmit monitoring instruction information to a second wireless audio output device through a first wireless link, the monitoring instruction information being configured to instruct the second wireless audio output device to monitor interactive information between the first wireless audio output device and an audio source, the first wireless audio output device and the second wireless audio output device having a same public-private key pair; and transmit a public key of the public-private key pair to the audio source through a second wireless link, receive a public key of the audio source through the second wireless link, enable the second wireless audio output device to snoop the public key of the audio source after receiving the monitoring instruction information, and determine link information in the second wireless link based on a private key of the public-private key pair and the public key of the audio source.

In some embodiments, the first wireless audio output device is configured to receive the public-private key pair from a secure manager.

In some embodiments, the secure manager includes any one of a Bluetooth headset charging box and a production line burning device.

In some embodiments, the first wireless audio output device includes any one of a Bluetooth headset and a Bluetooth speaker.

A second wireless audio output device is provided and configured to: receive monitoring instruction information from a first wireless audio output device through a first wireless link, the monitoring instruction information being configured to instruct the second wireless audio output device to monitor interactive information between the first wireless audio output device and an audio source, the first wireless audio output device and the second wireless audio output device having a same public-private key pair; snoop a public key of the audio source in a second wireless link, the second wireless link being a link through which the first wireless audio output device communicates with the audio source; and determine link information in the second wireless link based on a private key of the public-private key pair and the public key of the audio source.

In some embodiments, the second wireless audio output device is configured to: determine a shared key between the first wireless audio output device and the audio source based on the public key of the audio source and the private key of the public-private key pair; and determine the link information based on the shared key.

In some embodiments, the link information includes a link key, and the second wireless audio output device is configured to: snoop a random number in the second wireless link; and determine the link key based on the shared key, the random number, a Bluetooth address of the audio source, and a Bluetooth address of the first wireless audio output device.

In some embodiments, the link information includes a long-term key (LTK), and the second wireless audio output device is configured to: snoop a random number in the second wireless link; and determine the LTK based on the shared key, the random number, a Bluetooth address of the audio source, and a Bluetooth address of the first wireless audio output device.

In some embodiments, the second wireless audio output device is configured to: determining a session key based on the link information; and decrypt communication data in the second wireless link based on the session key, and acquire the decrypted communication data.

In some embodiments, the second wireless audio output device is configured to: snoop a random number in the second wireless link; and determine the session key based on the link information and the random number.

A wireless audio system is provided and includes a first wireless audio output device and at least one second wireless audio output device. The first wireless audio output device and the second wireless audio output device have a same public-private key pair. The first wireless audio output device is configured to: transmit monitoring instruction information to the second wireless audio output device through a first wireless link, the monitoring instruction information is configured to instruct the second wireless audio output device to monitor interactive information between the first wireless audio output device and an audio source; and transmit a public key of the public-private key pair to the audio source through a second wireless link, and receive a public key of the audio source through the second wireless link; and the second wireless audio output device is configured to: snoop the public key of the audio source in the second wireless link in response to the second wireless audio output device receiving the monitoring instruction information; and determine link information in the second wireless link based on a private key of the public-private key pair and the public key of the audio source.

A Bluetooth device is provided and includes n Bluetooth sub-devices, a first Bluetooth sub-device, and a second Bluetooth sub-device. n is an integer greater than 1, and the n Bluetooth sub-devices have a same public-private key pair. The first Bluetooth sub-device is configured to: transmit monitoring instruction information to a second Bluetooth sub-device, the monitoring instruction information is configured to instruct the second Bluetooth sub-device to monitor interactive information between the first Bluetooth sub-device and a terminal; and transmit a public key of the public-private key pair to the terminal, and receive a terminal public key of the terminal; and the second Bluetooth sub-device is configured to: snoop the terminal public key after receiving the monitoring instruction information from the first Bluetooth sub-device, and determine link information between the terminal and the first Bluetooth sub-device based on the terminal public key and a private key of the public-private key pair. The first Bluetooth sub-device is at least one Bluetooth sub-device in the n Bluetooth sub-devices, and the second Bluetooth sub-device is any one of the n Bluetooth sub-devices except the first Bluetooth sub-device.

In some embodiments, the second Bluetooth sub-device is configured to: determine a shared key between the terminal and the first Bluetooth sub-device based on the terminal public key and the private key of the public-private key pair; and determine the link information based on the shared key.

In some embodiments, the link information includes a link key, and the second Bluetooth sub-device is configured to: snoop a first random number and a second random number; and determine the link key based on the shared key, the first random number, the second random number, a plaintext string, a Bluetooth address of the terminal, and a Bluetooth address of the first Bluetooth sub-device. The first random number is a random value selected by the terminal, and the second random number is a random value selected by the first Bluetooth sub-device.

In some embodiments, the link information includes a long-term key (LTK), and the second Bluetooth sub-device is configured to: snoop a third random number and a fourth random number; and determine the LTK based on the shared key, the third random number, the fourth random number, a Bluetooth address of the terminal, and a Bluetooth address of the first Bluetooth sub-device. The third random number is a random value selected by the terminal, and the fourth random number is a random value selected by the first Bluetooth sub-device.

In some embodiments, the second Bluetooth sub-device is configured to: determine a session key based on the link information; and decrypt communication data between the first Bluetooth sub-device and the terminal based on the session key, and acquire the decrypted communication data.

In some embodiments, the second Bluetooth sub-device is configured to: snoop a fifth random number and a sixth random number; and determine the session key based on the link information, the fifth random number, and the sixth random number. The fifth random number is a random value selected by the terminal, and the sixth random number is a random value selected by the first Bluetooth sub-device.

A key determination system is provided and includes a Bluetooth device and a terminal. The Bluetooth device includes n Bluetooth sub-devices, the n is an integer greater than 1, and the n Bluetooth sub-devices have a same public-private key pair. The terminal includes a first Bluetooth sub-device and a second Bluetooth sub-device. The first Bluetooth sub-device is configured to: transmit monitoring instruction information to a second Bluetooth sub-device; and transmit a public key of the public-private key pair to the terminal. The monitoring instruction information is configured to instruct the second Bluetooth sub-device to monitor interactive information between the first Bluetooth sub-device and a terminal. The terminal is configured to transmit a terminal public key to the first Bluetooth sub-device. The second Bluetooth sub-device is configured to: snoop the terminal public key after receiving the monitoring instruction information from the first Bluetooth sub-device, and determine link information between the terminal and the first Bluetooth sub-device based on the terminal public key and a private key of the public-private key pair. The first Bluetooth sub-device is at least one Bluetooth sub-device in the n Bluetooth sub-devices, and the second Bluetooth sub-device is any one of the n Bluetooth sub-devices except the first Bluetooth sub-device.

It should be noted that the system provided in the above embodiments and the device embodiments belong to a same concept, and specific implementation processes are detailed in the device embodiments, which are not repeated here.

The above embodiments are only some embodiments of the present disclosure, and are not intended to limit the present disclosure. Any modification, equivalent replacement, and improvement, etc. made within a spirit and a principle of the present disclosure should be included in the scope of the present disclosure.

What is claimed is:

1. A first wireless audio output device, configured to:
   transmit monitoring instruction information to a second wireless audio output device through a first wireless link, the monitoring instruction information being configured to instruct the second wireless audio output device to monitor interactive information between the first wireless audio output device and an audio source, wherein the first wireless audio output device has a first public-private key pair, the second wireless audio output device has a second public-private key pair, and the first public-private key pair is the same as the second public-private key pair; and wherein the interactive information comprises a public key of the audio source;
   transmit a public key of the first public-private key pair to the audio source through a second wireless link and receive the public key of the audio source through the second wireless link, enabling the second wireless audio output device to;
   snoop the public key of the audio source after receiving the monitoring instruction information and determine link information in the second wireless link based on a private key of the second public-private key pair and the public key of the audio source snooped by the second wireless audio output device;
   wherein the first wireless link is between the first wireless audio output device and the second wireless audio output device, and the second wireless link is between the first wireless audio output device and the audio source.

2. The first wireless audio output device as claimed in claim 1, wherein the first wireless audio output device is configured to receive the first public-private key pair from a secure manager.

3. The first wireless audio output device as claimed in claim 2, wherein the secure manager comprises any one of a Bluetooth headset charging box and a production line burning device.

4. The first wireless audio output device as claimed in claim 1, further comprising any one of a Bluetooth headset and a Bluetooth speaker.

5. A second wireless audio output device, configured to:
   receive monitoring instruction information from a first wireless audio output device through a first wireless link, the monitoring instruction information being configured to instruct the second wireless audio output device to monitor interactive information between the first wireless audio output device and an audio source, wherein the first wireless audio output device has a first public-private key pair, the second wireless audio output device has a second public-private key pair, and the first public-private key pair is the same as the second public-private key pair, and wherein the interactive information comprises a public key of the audio source;
   snoop the public key of the audio source in a second wireless link, the second wireless link being a link through which the first wireless audio output device communicates with the audio source; and
   determine link information in the second wireless link based on a private key of the second public-private key pair and the public key of the audio source snooped by the second wireless audio output device;
   wherein the first wireless link is between the first wireless audio output device and the second wireless audio output device, and the second wireless link is between the first wireless audio output device and the audio source.

6. The second wireless audio output device as claimed in claim 5, configured to:
   determine a shared key between the first wireless audio output device and the audio source based on the public key of the audio source snooped by the second wireless audio output device and the private key of the second public-private key pair; and
   determine the link information based on the shared key.

7. The second wireless audio output device as claimed in claim 6, wherein the link information comprises a link key, and the second wireless audio output device is configured to:
   snoop a random number in the second wireless link; and determine the link key based on the shared key, the random number, a Bluetooth address of the audio source, and a Bluetooth address of the first wireless audio output device.

8. The second wireless audio output device as claimed in claim 6, wherein the link information comprises a long-term key (LTK), and the second wireless audio output device is configured to:
snoop a random number in the second wireless link; and
determine the LTK based on the shared key, the random number, a Bluetooth address of the audio source, and a Bluetooth address of the first wireless audio output device.

9. The second wireless audio output device as claimed in claim 5, configured to:
determining a session key based on the link information; and
decrypt communication data in the second wireless link based on the session key, and acquire the decrypted communication data.

10. The second wireless audio output device as claimed in claim 9, configured to:
snoop a random number in the second wireless link; and
determine the session key based on the link information and the random number.

11. A Bluetooth device, comprising:
n Bluetooth sub-devices, n being an integer greater than 1, each of the n Bluetooth sub-devices having a public-private key pair, and the public-private key pairs of the n Bluetooth sub-devices are the same;
wherein a first Bluetooth sub-device is configured to:
transmit monitoring instruction information to a second Bluetooth sub-device through a first wireless link, wherein the monitoring instruction information is configured to instruct the second Bluetooth sub-device to monitor interactive information between the first Bluetooth sub-device and a terminal, and the interactive information comprises a terminal public key of the terminal; and
transmit a public key of the public-private key pair of the first Bluetooth sub-device to the terminal through a second wireless link, and receive the terminal public key of the terminal; and
wherein a second Bluetooth sub-device is configured to:
snoop the terminal public key after receiving the monitoring instruction information from the first Bluetooth sub-device, and determine link information between the terminal and the first Bluetooth sub-device based on the terminal public key snooped by the second Bluetooth sub-device and a private key of the public-private key pair of the second Bluetooth sub-device;
wherein the first Bluetooth sub-device is at least one Bluetooth sub-device in the n Bluetooth sub-devices, and the second Bluetooth sub-device is any one of the n Bluetooth sub-devices except the first Bluetooth sub-device;
wherein the first wireless link is between the first Bluetooth sub-device and the second Bluetooth sub-device, and the second wireless link is between the first Bluetooth sub-device and the terminal.

12. The Bluetooth device as claimed in claim 11, wherein the second Bluetooth sub-device is configured to:
determine a shared key between the terminal and the first Bluetooth sub-device based on the terminal public key snooped by the second Bluetooth sub-device and the private key of the public-private key pair of the second Bluetooth sub-device; and
determine the link information based on the shared key.

13. The Bluetooth device as claimed in claim 12, wherein the link information comprises a link key, and the second Bluetooth sub-device is configured to:
snoop a first random number and a second random number; and
determine the link key based on the shared key, the first random number, the second random number, a plaintext string, a Bluetooth address of the terminal, and a Bluetooth address of the first Bluetooth sub-device;
wherein the first random number is a random value selected by the terminal, and the second random number is a random value selected by the first Bluetooth sub-device.

14. The Bluetooth device as claimed in claim 13, wherein the first random number and the second random number are 128-bit values, and are arbitrary or non-repeated random values that are used only once or one time.

15. The Bluetooth device as claimed in claim 13, wherein all Bluetooth sub-devices know each Bluetooth address of each Bluetooth sub-device, and each Bluetooth address is preset when the all Bluetooth sub-devices are bound into the Bluetooth device.

16. The Bluetooth device as claimed in claim 12, wherein the link information comprises a long-term key (LTK), and the second Bluetooth sub-device is configured to:
snoop a third random number and a fourth random number; and
determine the LTK based on the shared key, the third random number, the fourth random number, a Bluetooth address of the terminal, and a Bluetooth address of the first Bluetooth sub-device;
wherein the third random number is a random value selected by the terminal, and the fourth random number is a random value selected by the first Bluetooth sub-device.

17. The Bluetooth device as claimed in claim 16, wherein the third and fourth random numbers are 128-bit values, and are arbitrary or non-repeated random values that are used only once.

18. The Bluetooth device as claimed in claim 11, wherein the second Bluetooth sub-device is configured to:
determine a session key based on the link information; and
decrypt communication data between the first Bluetooth sub-device and the terminal based on the session key, and acquire the decrypted communication data.

19. The Bluetooth device as claimed in claim 18, wherein the second Bluetooth sub-device is configured to:
snoop a fifth random number and a sixth random number; and
determine the session key based on the link information, the fifth random number, and the sixth random number;
wherein the fifth random number is a random value selected by the terminal, and the sixth random number is a random value selected by the first Bluetooth sub-device.

20. The Bluetooth device as claimed in claim 19, wherein the fifth and sixth random numbers are arbitrary or non-repeated random values that are used only once.

* * * * *

UNITED STATES PATENT AND TRADEMARK OFFICE
CERTIFICATE OF CORRECTION

PATENT NO. : 12,282,228 B2  
APPLICATION NO. : 18/503072  
DATED : April 22, 2025  
INVENTOR(S) : Chaojie Xu Page 1 of 1

It is certified that error appears in the above-identified patent and that said Letters Patent is hereby corrected as shown below:

On the Title Page

(63) Continuation of application No. 18/104,852, filed on Feb. 2, 2023, now Pat. No. 11,892,732, which is a
 (Continued)
Should be corrected to read:
(63) Continuation of application No. PCT/CN2022/085729, filed on Apr. 8, 2022.

Page 2, left column, the following paragraph should be deleted:
"Related U.S. Application Data
continuation of application No. 17/645,884, filed on Dec. 23, 2021, now Pat. No. 11,598,991, which is a continuation of application No. 17/019,503, filed on Sep. 14, 2020, now Pat. No. 11,243,439, which is a continuation of application No. 15/127,427, filed as application No. PCT/JP2015/056156 on Mar. 3, 2015, now Pat. No. 10,795,208."

Signed and Sealed this  
Third Day of February, 2026

John A. Squires  
*Director of the United States Patent and Trademark Office*